No. 649,919. Patented May 22, 1900.
C. T. DRIGGS.
LOAD INDICATOR FOR VEHICLES.
(Application filed Mar. 27, 1899.)
(No Model.)
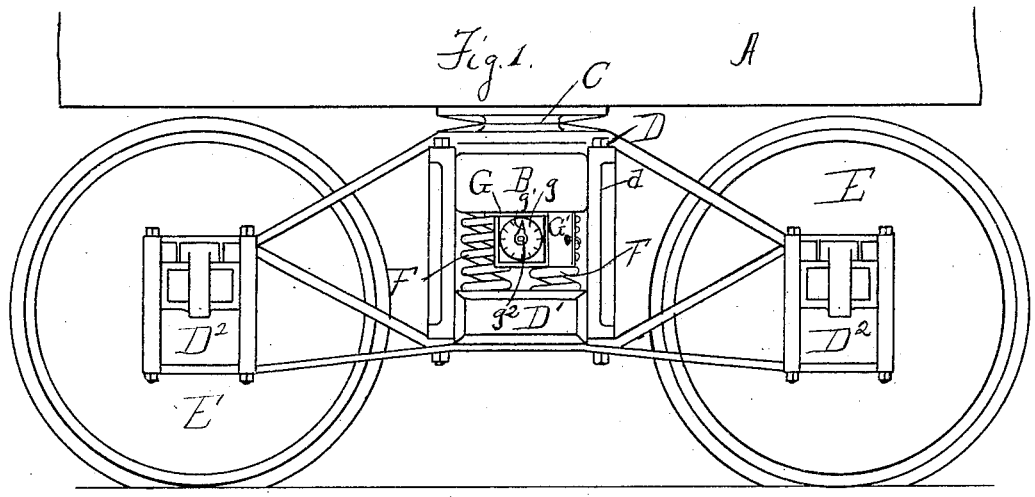
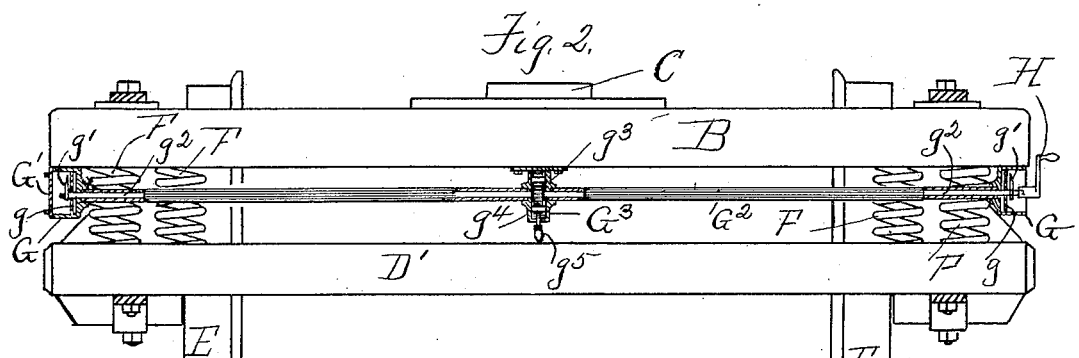
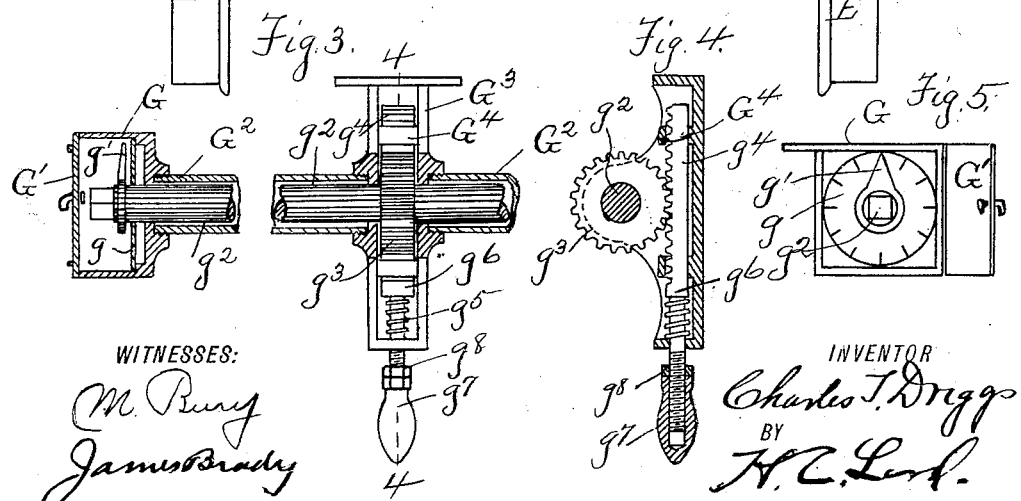
WITNESSES:
M. Burry
James Brady
INVENTOR
Charles T. Driggs
BY
H. C. Leaf.
ATTORNEY.
THE NORRIS PETERS CO., PHOTO-LITHO., WASHINGTON, D. C.

UNITED STATES PATENT OFFICE.

CHARLES T. DRIGGS, OF ERIE, PENNSYLVANIA.

LOAD-INDICATOR FOR VEHICLES.

SPECIFICATION forming part of Letters Patent No. 649,919, dated May 22, 1900.

Application filed March 27, 1899. Serial No. 710,597. (No model.)

*To all whom it may concern:*

Be it known that I, CHARLES T. DRIGGS, a citizen of the United States, residing at Erie, in the county of Erie and State of Pennsylvania, have invented certain new and useful Improvements in Load-Indicators for Vehicles; and I do hereby declare the following to be a full, clear, and exact description of the invention, such as will enable others skilled in the art to which it appertains to make and use the same.

This invention relates to load-indicators for vehicles; and it consists in certain improvements in the construction thereof, as will be hereinafter fully described, and pointed out in the claims.

I have shown my invention as adapted to the use of cars, and some features of the invention are confined to such use.

The object of the invention is to weigh the load which may be placed upon the vehicle by measuring the flexure of the springs sustaining the load on said vehicle, or, in other words, by utilizing the springs of the vehicle for forming a spring-scale by which the load in the vehicle may be measured.

The invention is illustrated in the accompanying drawings, as follows:

Figure 1 shows a side elevation of the end of a car, a fragment only of the body being shown. Fig. 2 shows an end elevation of the car-truck. Fig. 3 shows a section of the indicating mechanism. Fig. 4 also shows a section of the indicating mechanism on the lines 4 4 in Fig. 3. Fig. 5 shows an enlarged view of the dial.

A marks the car-body; C, the bolster-plate; B, the spring-beam; D, the truck-frame; D', the base-plate of the truck-frame; $d$, the guides, in which the spring-plate moves; $D^2$, the axle-bearings; E, the car-wheels; and F the springs, which are placed in the usual manner between the spring-beam B and the base-plate D'.

The dial $g$ is placed in a case G, which is secured to the under side of the spring-beam B. An indicator-hand $g'$ is secured on a rod $g^2$, which is journaled in a pipe $G^2$. By rotating the rod the hand $g'$ may be brought to any point on the dial, which is graduated as may be required. The pipe $G^2$ is secured to a bracket $G^3$, which is placed as near the center of the spring-beam B as the truck mechanism will permit. A rack $g^4$ is carried in guides $G^4$ in the bracket $G^3$, so that it is free to slide in the bracket $G^3$ toward and from the base-plate D'. The lower end of the rack is extended in a round portion, which forms a shoulder $g^6$ at its upper end and has its lower end screw-threaded. A spring $g^5$ is tensioned between the shoulder $g^6$ and the bottom of the bracket $G^3$ and presses the rack $g^4$ upwardly. A nut $g^7$ is secured onto the lower end of the rack extension and is secured in place by a jam-nut $g^8$. A pinion $g^3$ is fixed on the rod $g^2$ and meshes with the rack $g^4$. The rod $g^2$ is extended beyond the rack $g^4$ to the opposite side of the truck, where the dial mechanism is duplicated. The ends of the rod $g^2$ are squared, so that a crank H may be fitted onto it to turn the rod $g^2$ when an indication is desired. A door $G'$ is arranged to close the case G, so as to protect the dial-hand $g'$.

It will readily be understood that a certain flexure of the springs F is effected by a certain load on the vehicle and that this same flexure would be effected whenever this load may be sustained by the vehicle, so that to measure the load by the vehicle it is only necessary to ascertain the flexure of the springs under certain loads and then provide mechanism to indicate this flexure to weigh the load which is sustained by the vehicle. It is desirable to have the indicating mechanism thrown out of contact with the parts supporting the springs and the parts supported by the springs, in order that the constant vibration may be eliminated from the indicating mechanism, in order that the wear upon said mechanism may be as little as possible. In the mechanism herein shown the indicator does not normally indicate the load; but by turning the rod $g^2$ until the nut $g^7$ is brought into contact with the base-plate D' the dial and hand will indicate the load which is sustained by the vehicle. Immediately the indication is read and the rod $g^2$ released the spring $g^5$ pushes the rack with the nut $g^7$ up out of contact with the base-plate D', so that all vibration incident to the flexure of the springs is eliminated.

To adjust the device on a car, it is necessary to ascertain exactly the flexure of the springs under the different loads at which it is desired that the apparatus shall indicate.

By having a variety of dials a dial properly graduated to indicate the load corresponding to the various flexures is inserted in the case G. The nut $g^7$ may be turned up or down to get the proper initial position, and then if the dial is properly graduated it will indicate, when the rod $g^2$ is turned to bring the nut $g^7$ into contact with the base-plate G', the load sustained by the vehicle. Various mechanism may be utilized for determining the exact flexure of the springs under certain loads, so that the mechanism may be readily applied and the proper dial provided.

It is desirable that all the indications may be read from one side of the car and preferably at both sides of a car in order that a party reading the indications for a train may not have to pass from one side to the other of the car. I have accomplished this by connecting the dials at the opposite sides of the truck by the rod $g^2$, so that the dial indication at one side of the truck is communicated to the opposite end. The flexure of each side of the truck may be taken independently by the apparatus shown, if desired; but I prefer that the rack $g^4$ be arranged to bring the nut $g^7$ into contact with the bottom plate as nearly opposite the center of the spring-beam B as the mechanism of the truck will allow. At this point the average flexure of all the springs is indicated, so that the total load on the truck may be ascertained at this one point, thus eliminating the necessity of adding the totals where the opposite ends of the trucks are taken separately, and as this total weight of the truck is indicated at both sides of the car the total weight of the car in a train can be taken without passing from side to side of the train, it simply requiring the addition of the two ends of the car to ascertain the entire weight sustained. In the construction shown the spring-beam forms a rigid member supported by the springs and the base-plate or truck-frame, the member supporting the springs.

What I claim as new is—

1. In a load-indicating device for vehicles, the combination with the springs; a member supported by the springs; and a member supporting the springs; of a slide arranged to move in the direction of the flexure of the spring, said slide being carried by one of said members and being arranged to contact the opposite member by a sliding movement from the normal position; means for automatically moving and holding said slide normally out of contact; and an indicator arranged to show the movement of said slide from the normal position to the point of contact.

2. In a load-indicating device for vehicles, the combination of the vehicle-body; the running-gear; a spring between said body and running-gear; of a slide arranged to move in the direction of the flexure of the spring, said slide being carried by one of said members and being arranged to contact the opposite member by a sliding movement from the normal position; a spring for automatically moving and holding said slide normally out of contact; and an indicator arranged to show the movement of said slide from the normal position to the point of contact.

3. In a load-indicating device for vehicles, the combination with the springs; a member supported by the springs; and a member supporting the springs; of a slide arranged to move in the direction of the flexure of the springs, said slide being carried by one of the members of the vehicle operating at one end of the springs and being arranged to contact a member arranged at the opposite end of the springs; a rack on said slide; a pinion arranged to engage the said rack; a rod on which said pinion is journaled; a hand on said rod; a dial-indicator under said hand; and means for automatically moving and holding said slide normally out of contact.

4. In a load-indicating device for cars, the combination with the springs; a rigid member supported by the springs; a member supporting said springs; a slide carried by one of said members and arranged to have a sliding movement on the member by which it is carried toward and from the opposite member and to contact in its movement approximately the center of the opposite member; and an indicator to show the movement of the slide.

5. In a load-indicating device for cars, the combination with the springs; a rigid member supported by the springs; a member supporting said springs; a slide carried by one of said members and arranged to have a sliding movement on the member by which it is carried toward and from the opposite member and to contact in its movement approximately the center of the opposite member; means for automatically holding said slide normally out of contact; and an indicator to show the movement of said slide necessary to bring it into contact with the opposite member.

6. In a load-indicating device for cars, the combination with the springs; a rigid member supported by the springs; a member supporting said springs; a dial at the side of the car; a hand arranged over said dial; a rod carried by one of said members and carrying said hand and running to the center of said members; a contact-slide arranged to show by its movement the relative position of said members to each other, said rod being arranged to be actuated toward and from contact by the rotation of said rod carrying said hand.

7. In a load-indicating device for cars, the combination with the springs; a rigid member supported by the springs; a member supporting said springs; a dial at both sides of the car; hands to operate over said dial; a rod carried by one of said members connecting said hands; a slide carried by one of said members at the center of said members and arranged to be operated by said rod to actuate it with a sliding movement toward and from the opposite member, and to indicate by its movement, the position of said members relatively to each other.

8. In a load-indicating device for cars, the combination with the springs; a rigid member supported by the springs; a member supporting said springs; of the dial, $g$; hand, $g'$, arranged over said dial; the rod, $g^2$, carrying said hand; the pinion, $g^3$, fixed on said shaft; the rack, $g^4$, arranged to mesh the said pinion and to contact in its movement, the center of one of said members; and means for automatically holding said rack normally out of contact.

9. In a load-indicating device for cars; the combination with the springs; a rigid member supported by the springs; a member supporting said springs; of the casings, G G, secured to one of said members; the bracket, $G^3$, secured to said member; the pipes, $G^2$, connecting said bracket with said casings; the dial, $g$, in said casings; the hands, $g'$, arranged over said dial; the rod, $g^2$, carrying said hands; the pinion, $g^3$, on said rod; the rack, $g^4$, arranged in the bracket, $G^3$, in position to contact the center of the supporting member in its movement; and the spring, $g^5$, for holding said rack normally out of contact with said supporting member.

In testimony whereof I affix my signature in presence of two witnesses.

CHARLES T. DRIGGS.

Witnesses:
M. BURY,
JAMES BRADY.